US00RE42555E

(19) United States
(12) Reissued Patent
Lin et al.

(10) Patent Number: US RE42,555 E
(45) Date of Reissued Patent: Jul. 19, 2011

(54) MERGED PIPELINE FOR COLOR INTERPOLATION AND EDGE ENHANCEMENT OF DIGITAL IMAGES

(75) Inventors: Tao Lin, Shanghai (CN); Vincent Chor-Fung Yu, Sunnyvale, CA (US); Tianhua Tang, San Jose, CA (US); Beong-Kwon Hwang, San Jose, CA (US)

(73) Assignee: Faust Communications, LLC, Las Vegas, NV (US)

(21) Appl. No.: 11/267,917

(22) Filed: Nov. 4, 2005

Related U.S. Patent Documents

Reissue of:
(64) Patent No.: 6,642,962
Issued: Nov. 4, 2003
Appl. No.: 09/388,318
Filed: Sep. 1, 1999

(51) Int. Cl.
*H04N 5/208* (2006.01)

(52) U.S. Cl. ..... 348/252; 348/222.1; 348/352; 348/223.1; 382/266

(58) Field of Classification Search ..... 348/222.1, 348/252
See application file for complete search history.

(56) References Cited

U.S. PATENT DOCUMENTS 4,760,441 A 7/1988 Kohno
4,764,805 A 8/1988 Rabbani et al.
4,796,085 A 1/1989 Shinada
4,796,095 A 1/1989 Shinada
5,008,739 A 4/1991 D'Luna et al.
5,172,227 A 12/1992 Tsai et al.
5,260,774 A 11/1993 Takayama
5,262,849 A 11/1993 Mimura et al.
5,265,200 A 11/1993 Edgar
5,325,182 A 6/1994 Murata et al.
5,371,546 A 12/1994 Kitsuki
5,382,976 A 1/1995 Hibbard
5,396,441 A 3/1995 Ozawa
5,414,465 A 5/1995 Kodama et al.
5,504,524 A 4/1996 Lu et al.
5,506,619 A 4/1996 Adams, Jr. et al.
5,528,292 A 6/1996 Ikeda ..... 348/222
5,579,047 A 11/1996 Yamagami et al.
5,596,367 A 1/1997 Hamilton, Jr. et al.
5,739,867 A 4/1998 Eglit
5,808,674 A 9/1998 Adams, Jr. et al.
(Continued)

*Primary Examiner* — Tuan Ho

(57) ABSTRACT

A digital-camera processor receives mono-color digital pixels from an image sensor. Each mono-color pixel is red, blue, or green. The stream of pixels from the sensor has alternating green and red pixels on odd lines, and blue and green pixels on even lines in a Bayer pattern. Each mono-color pixel is white balanced by multiplying with a gain determined in a previous frame and then stored in a line buffer. A horizontal interpolator receives an array of pixels from the line buffer. The horizontal interpolator generates missing color values by interpolation within horizontal lines in the array. The intermediate results from the horizontal interpolator are stored in a column buffer, and represent one column of pixels from the line buffer. A vertical interpolator generates the final RGB value for the pixel in the middle of the column register by vertical interpolation. The RGB values are converted to YUV. The vertical interpolator also generates green values for pixels above and below the middle pixel. These green values are sent to an edge detector. The edge detector applies a filter to the 3 green values and 6 more green values from the last 2 clock cycles. When an edge is detected, an edge enhancer is activated. The edge enhancer adds a scaled factor to the Y component to sharpen the detected edge. Color enhancement is performed on the U and V components. The line buffer stores only 4 full lines of pixels and no full-frame buffer is needed.

82 Claims, 11 Drawing Sheets

U.S. PATENT DOCUMENTS 5,821,999 A 10/1998 Barnsley et al.
5,886,797 A 3/1999 Shimura
5,887,085 A 3/1999 Otsuka
5,889,554 A 3/1999 Mutze
5,987,221 A 11/1999 Bearss et al.
6,421,084 B1 7/2002 Chang et al.
6,563,537 B1 5/2003 Kawamura et al.

| | | | | | |
|---|---|---|---|---|---|
| RED 1,1 | GREEN 1,2 | RED 1,3 | GREEN 1,4 | RED 1,5 | GREEN 1,6 |
| GREEN 2,1 | BLUE 2,2 | GREEN 2,3 | BLUE 2,4 | GREEN 2,5 | BLUE 2,6 |
| RED 3,1 | GREEN 3,2 | RED 3,3 | GREEN 3,4 | RED 3,5 | GREEN 3,6 |
| GREEN 4,1 | BLUE 4,2 | GREEN 4,3 | BLUE 4,4 | GREEN 4,5 | BLUE 4,6 |

| | | | | | |
|---|---|---|---|---|---|
| RED 1,797 | GREEN 1,798 | RED 1,799 | GREEN 1,800 | | |
| GREEN 2,797 | BLUE 2,798 | GREEN 2,799 | BLUE 2,800 | | |
| RED 3,797 | GREEN 3,798 | RED 3,799 | GREEN 3,800 | | |
| GREEN 4,797 | BLUE 4,798 | GREEN 4,799 | BLUE 4,800 | | |

| | | | | | |
|---|---|---|---|---|---|
| RED 599,1 | GREEN 599,2 | RED 599,3 | GREEN 599,4 | RED 599,5 | GREEN 599,6 |
| GREEN 600,1 | BLUE 600,2 | GREEN 600,3 | BLUE 600,4 | GREEN 600,5 | BLUE 600,6 |

| | | | | | |
|---|---|---|---|---|---|
| RED 599,797 | GREEN 599,798 | RED 599,799 | GREEN 599,800 | | |
| GREEN 600,797 | BLUE 600,798 | GREEN 600,799 | BLUE 600,800 | | |

PRIOR ART

FIG. 2

| | | | |
|---|---|---|---|
| R11 | G12 | R13 | G14 |
| G21 | B22 | G23 | B24 |
| R31 | G32 | R33 | G34 |
| G41 | B42 | G43 | B44 |
| R51 | G52 | R53 | G54 |

30

FIG. 5

MERGED PIPELINE FOR COLOR INTERPOLATION AND EDGE ENHANCEMENT OF DIGITAL IMAGES

Matter enclosed in heavy brackets [ ] appears in the original patent but forms no part of this reissue specification; matter printed in italics indicates the additions made by reissue.

FIELD OF THE INVENTION

This invention relates to digital cameras, and more particularly to digital signal processing that integrates color interpolation with edge detection.

BACKGROUND OF THE INVENTION

Digital cameras are being improved and lowered in cost at an amazing rate. In a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

FIG. 1 is a block diagram for a typical digital camera. Light focused through a lens is directed toward sensor 12, which can be a charge-coupled device (CCD) array or a complementary metal-oxide-semiconductor (CMOS) sensor array. The light falling on the array generates electrical currents, which are amplified by analog amp 14 before being converted from analog to digital values by A/D converter 16. An 8, 9, or 10-bit mono-color pixel is output to processor 10. These mono-color pixels are in a Bayer-pattern as shown in FIG. 2. Each pixel is either a red, a blue, or a green intensity.

The R, G, or B digital values in the Bayer pattern are processed by processor 10 to generate luminance-chrominance YUV pixels. The YUV pixels can then be displayed on display 19 or compressed by compressor 18 and stored on disk 17 or on a solid-state memory. YUV pixels often have a 4:4:4 format, with 8 bits for each of 2 colors and for the luminance.

Sensor 12 detects red, blue and green colors. However, each array point in sensor 12 can detect only one of the three primary colors. Rather than outputting an RGB pixel, sensor 12 can output only a single-color pixel at any given time. For example, a line of pixels output by sensor 12 might have a red pixel followed by a green pixel. Another line might have alternating green and blue pixels.

Each pixel represents the intensity of one of the primary colors at a point in the sensor array. Thus a red pixel indicates the intensity of red light at a point, while a neighboring green pixel indicates the intensity of green light at the next point in the sensor array. Each pixel contains only one-third of the total color information.

The remaining color information is obtained by interpolation. The green intensity of a red pixel is calculated by averaging the green intensities of neighboring green pixels. The blue intensity for that red pixel is calculated by averaging or interpolating the nearest blue pixels. Processor 10 performs this color interpolation, calculating the missing primary-color intensities for each pixel location.

Processor 10 also may perform other enhancements to the image. Edges may appear fuzzy because the color interpolation tends to spread out features. These edges can be sharpened by detecting the edges and enhancing the color change at the edge to make the color transition more abrupt. Color conversion from RGB to YUV is also performed by processor 10.

The electrical currents produced by the different primary colors can vary, depending on the sensor used and the wavelength and energy of the light photons. An adjustment known as a white-balance is often performed before processor 10, either on analog or digital values. Each primary color can be multiplied by a different gain to better balance the colors. Compensation can also be made for different lighting conditions, increasing all primary colors for dark pictures or decreasing all colors for bright pictures (overexposure).

Bayer Pattern—FIG. 2

FIG. 2 shows an image captured by a sensor that generates single-color pixels in a Bayer pattern. The example shows an 800×600 frame or image for display in the common super-VGA resolution. A total of 600 lines are captured by the sensor, with 800 pixels per line.

A personal computer displays full-color pixels that have all three primary-color intensities (RGB). In contrast, the sensor in a digital camera can detect only one of the three primary colors for each point in the 800×600 sensor array. Detectors for green are alternated with red detectors in the first line, while green detectors are alternated with blue detectors in the second line.

The first horizontal line and each odd line have alternating red and green detectors, so pixels output from these odd lines are in a R-G-R-G-R-G-R-G sequence. The second horizontal line and each even line have alternating green and blue detectors, so pixels output from these even lines are in a G-B-G-B-G-B-G-B sequence.

Half of the pixels are green pixels, while one-quarter of the pixels are read and the last quarter are blue. The green pixels form a checkerboard pattern, with blue and red pixels surrounded by green pixels. Since the human eye is more sensitive to green, the Bayer pattern has more green pixels than red or blue.

The green intensity for a red pixel location can be interpolated by averaging the four green pixels that surround the red pixel. For example, the green intensity for red pixel at location (3,3) is the sum of green pixels (3,2), (3,4), (2,3), and (4,3), divided by four. Likewise, the green intensity for a blue pixel location can be interpolated by averaging the four surrounding green pixels. For blue pixel (2,4), the interpolated green intensity is the sum of green pixels (2,3), (2,5), (1,4), and (3,4), divided by four.

The red and blue values for a green pixel location can also be calculated from the 2 red and 2 blue pixels that surround each green pixel. For green pixel (2,3), the interpolated red value is the average of red pixels (1,3) and (3,3) above and below the green pixel, while the interpolated blue value is the average of blue pixels (2,2) and (2,4) to the right and left of the green pixel.

Many different techniques have been used for color interpolation and white balance. See U.S. Pat. Nos. 5,504,524 and 5,260,774, which show white-balance from analog signals. Sometimes a whole frame buffer is used for white balance or interpolation. Whole-frame buffers can be large, mega-pixel buffers that hold all 800×600 pixels. See, U.S. Pat. No. 5,260,774, FIGS. 1-3. Color and edge enhancement are often not performed or are performed by a separate unit, perhaps also using a whole-frame buffer.

While such digital-camera processors are useful, cost reduction is desirable since digital cameras are price-sensitive consumer devices. Whole-frame buffers require large memories, and as digital cameras are increased in resolution, larger memories are needed for the larger number of pixels.

What is desired is a digital-camera processor that does not use a whole-frame buffer. It is desired to perform color interpolation of Bayer-pattern pixels without storing all the pixels in a frame. It is desired to use smaller line buffers, which store only a few lines of pixels rather than all 600 lines in a SVGA image. It is further desired to perform both color interpolation and edge detection at the same time, using integrated hardware. It is desired to merge the edge detector into the interpolator. It is desired to also perform while balance, edge enhancement, and YUV conversion without using a whole-frame buffer. It is desired to process all pixels in a frame in a single pass, without storing all the pixels.

SUMMARY OF THE INVENTION

A digital-image processor has a line buffer that receives mono-color pixels captured by an image sensor. The line buffer stores only a fraction of a whole frame of an image. The fraction is less than 5 percent of a number of pixels in the whole frame.

A merged pipeline receives an array of mono-color pixels from the line buffer. It generates missing color values for a middle pixel. The middle pixel is a mono-color pixel in a middle of the array from the line buffer.

The merged pipeline also generates an upper primary color value for an upper pixel immediately above the middle pixel and a lower primary color value for a lower pixel immediately below the middle pixel.

An edge detector receives the upper primary color value and the lower primary color value and a primary color value for the middle pixel. The edge detector detects an edge between the middle pixel and a neighboring pixel. An edge enhancer is activated by the edge detector when the edge is detected. It increases a magnitude of the middle pixel when the edge is detected. The merged pipeline outputs interpolated color values for the middle pixel. Thus interpolation and edge detection are performed by the merged pipeline using the line buffer.

In further aspects of the invention a color-space converter is coupled to receive the middle pixel including the missing color values generated by the merged pipeline. It converts color values into luminance and chromatic values. The edge enhancer increases the luminance value of the middle pixel when activated. The color-space converter converts from red, green, blue RGB color values to luminance and chromatic YUV values representing a color of a pixel.

In further aspects the edge detector receives green color values. The edge detector performs edge detection using green values, but the edge enhancer sharpens edges by adjusting the luminance value of the middle pixel.

In further aspects the merged pipeline has a horizontal interpolator that receives the array from the line buffer. It averages mono-color pixels within a same horizontal line to produce intermediate color values. A column register is coupled to receive the intermediate color values from the horizontal interpolator. It stores intermediate color values for a single column of pixels in the array. A vertical interpolator receives the intermediate color values from the column register. It averages intermediate color values within a same single column of pixels. The vertical interpolator outputs RGB color values for the middle pixel, but it also outputs G values as the upper and lower primary color values to the edge detector. Thus horizontal and vertical interpolation are performed separately.

In still further aspects of the invention the column register includes one green register for each of at least 5 lines. The column register also includes at least 3 shared registers for a middle line containing the middle pixel and an upper and a lower line immediately above and below the middle line. Thus the shared registers alternately store red and blue color values for alternate clock cycles.

BRIEF DESCRIPTION OF THE DRAWINGS

FIG. 2 shows an image captured by a sensor that generates single-color pixels in a Bayer pattern.

FIG. 5 shows two successive 5×3 arrays of Bayer-pattern pixels from the line buffer which are input to the horizontal interpolator during 2 clock cycles.

DETAILED DESCRIPTION

Figure 1:
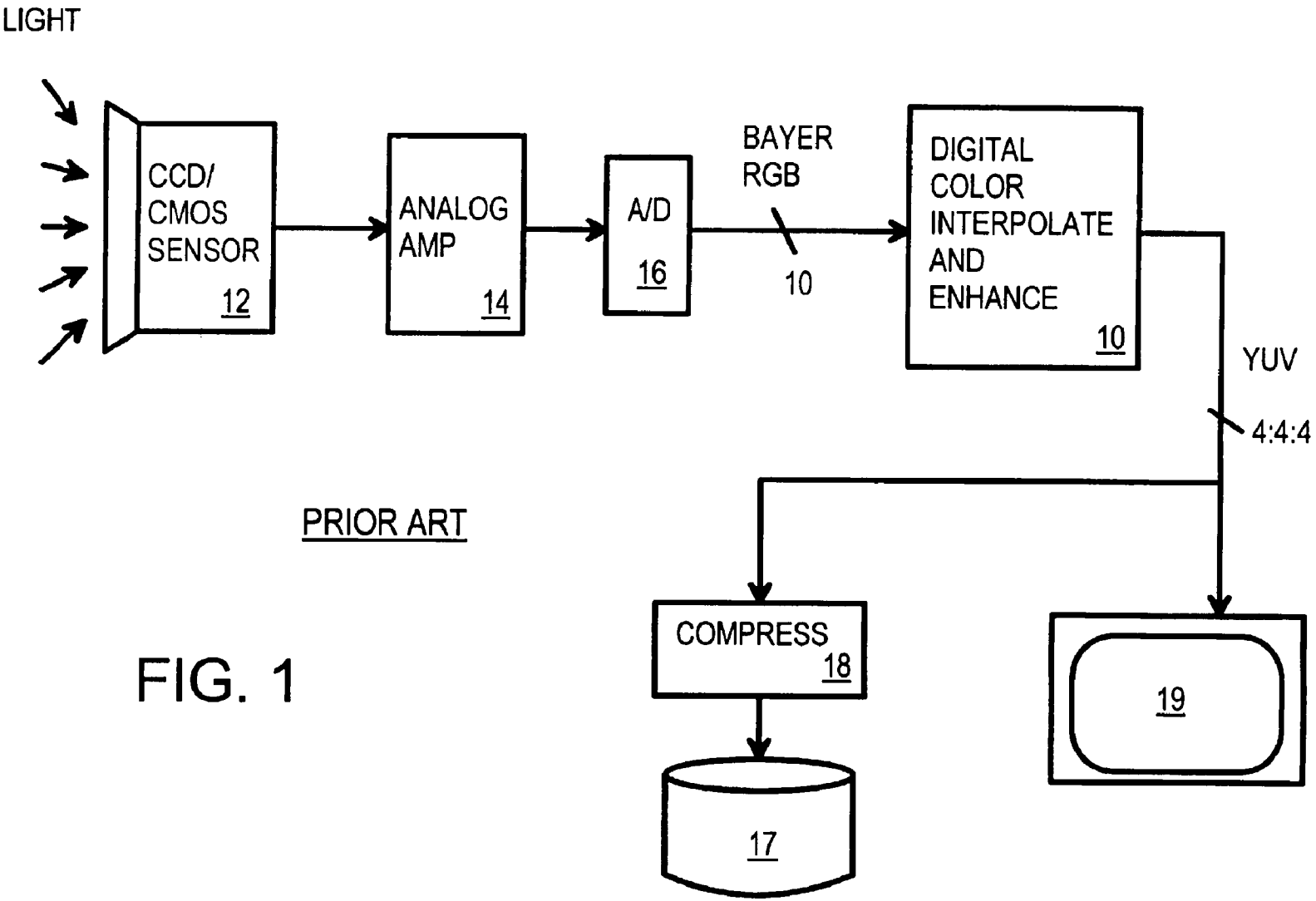
PRIOR ART FIG. 1
FIG. 1 is a block diagram for a typical digital camera.

The present invention relates to an improvement in digital-image processing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Minimizing the amount of buffer memory required to process images from a digital camera is an important design goal. The inventors have realized that whole-frame buffers become more expensive as camera resolution increases, since each image contains more pixels. Such whole-frame buffers are often used between the different processing units, such as between the color interpolator and the edge detector and color enhancer.

The different processing units, such as white balance, pixel-interpolation, edge detect and enhancement, YUV conversion and color enhancement usually operate as independent units. Buffers are used between units to allow for slightly different processing rates. These buffers require memory and add cost.

The inventors have realized that a tightly-integrated processor can perform the various functions in a single, tightly-coupled pipeline. In particular, pixel interpolation and edge detection can use many, of the same adders and storage registers, allowing interpolation and edge detection to be performed at the same time on the same area of the image. The interpolation results can immediately be converted to YUV format, enhanced, and output, eliminating the need for large intermediate buffers.

White balance can be performed on the fly as the pixels are sent from the sensor to the interpolator. Thus a separate frame buffer for white balance can also be eliminated.

A small buffer is used between the white balancer and the interpolator. This is a line buffer rather than a frame buffer, since only a few lines of the image are stored. The line buffer stores a portion of the image that is currently being interpolated. Only 2 to 4 lines of the 600 or more lines need to be stored in the line buffer, providing a memory savings of better than 99%. Even for different resolutions, the line buffers still require only 5% of the memory needed for a whole frame buffer.

Using the 2-4 line buffer, plus a few individual pixel registers in the pipeline, allows the following operations to be performed in a single pass through the processor:

White Balance
Pixel Interpolation
Edge Detection
RGB-to-YUV Conversion
Edge Enhancement
Color Enhancement No frame buffers are needed within the pipeline. The sensor can input pixels in the Bayer pattern directly to the processor without buffering. Pixels output from the processor can be immediately sent to display, storage, or compression buffers.

Figure 3:
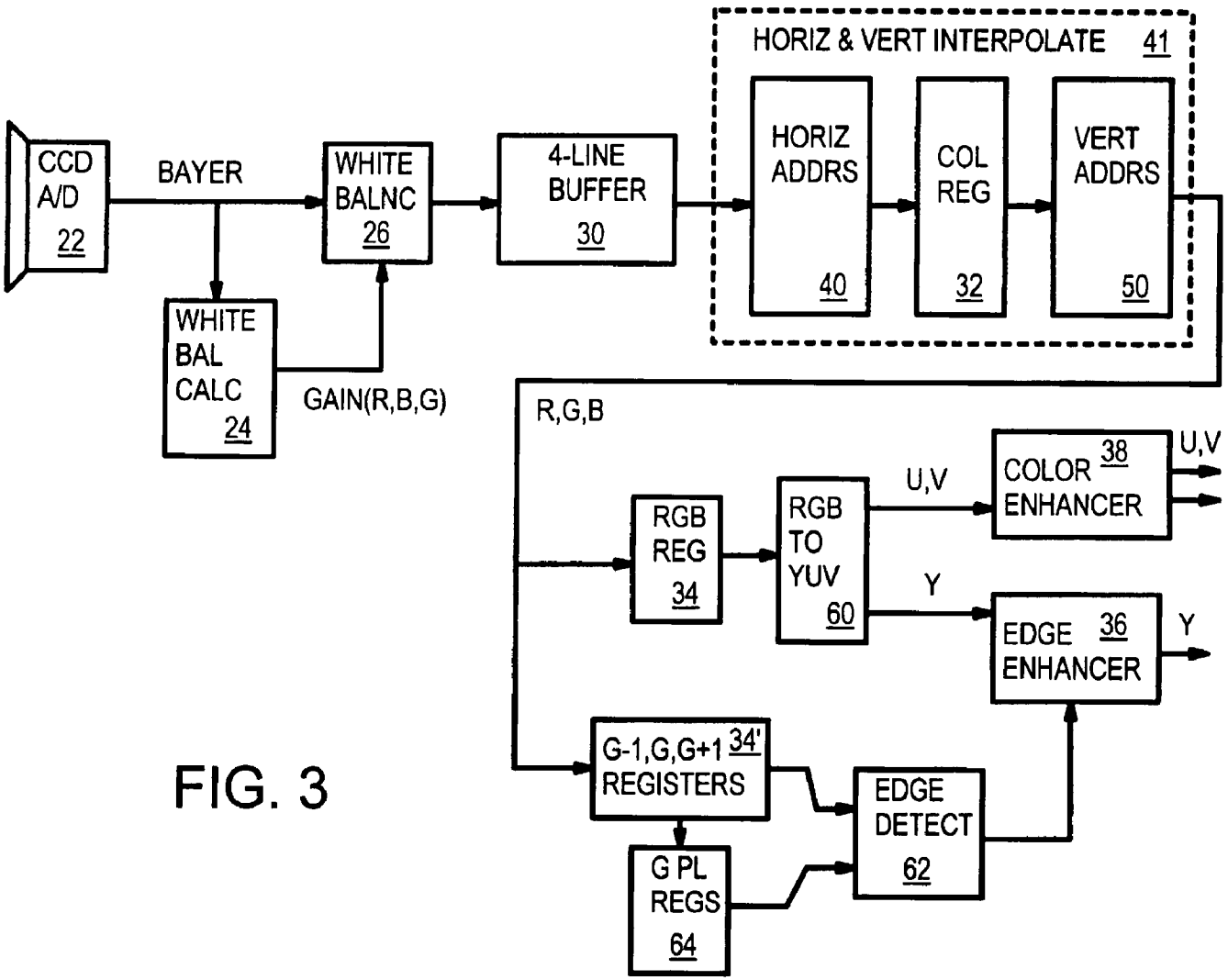
FIG. 3 shows a multi-function image processor using a 4-line buffer and a column register.

Interpolator Uses 4-Line Buffer and Column Register—FIG. 3

FIG. 3 shows a multi-function image processor using a 4-line buffer and a column register. Light captured by sensor front-end 22 is converted to electrical signals by a charge-coupled or transistor device, and the electrical signals are converted from analog to digital format. The image sensor does not generate all three primary color components (RGB) for each pixel, but only produces one of the three color components per pixel. The colors produced alternate from pixel to pixel, and from line to line in a Bayer pattern as shown in FIG. 2. Typically one pixel with only one of the three primary colors is output for each clock cycle.

The sensitivity of the sensor to the different primary colors is not equal. Some colors experience more attenuation than others. Also, the image may be under or over exposed. White balancer 26 multiplies each pixel from front end 22 by a gain. Red pixels are multiplied by a red gain, blue pixels by a blue gain, and green pixels by a green gain. The pixel-gain product is output from white balancer 26 to line buffer 30.

The pixel gains may be pre-set gains, or may be calculated on the fly. Pre-set gains can be calculated at the factory for the sensor type and fixed gains stored in a register and applied to white balancer 26. Video digital cameras produce a series of frames, and still cameras are normally pointed toward the picture before shooting, so gain calculator 24 can generate a running average of all pixels for each of the 3 colors from one frame, and use the averages to calculate gains for the next frame. Averages can also be generated for just a portion of an image frame, and the gains applied to the entire image or a portion of the image.

Four-line buffer 30 contains about four lines of pixels, rather than all 600 or more lines. For SVGA resolution, each line contains 800 pixels, so line buffer 30 contains 800×4 or 3,200 pixels. These are single-color pixels of 12 bits per color, so the memory size is 38 Kbytes. Other resolutions, such as 1024×768 have more pixels per line, so the size of line buffer 30 can increase to 48 Kbytes or more.

Interpolator 41 performs both horizontal and vertical interpolation to generate all three color components (R,G,B) for each pixel. Interpolation is performed by adding weighted color values from neighboring pixels of the desired color. Only the neighboring pixels that touch the current pixel location are added in the interpolation. There are a total of 8 such neighboring pixels—three pixels on three lines.

The interpolation weighting or filter varies by color, since there are twice as many green pixels in a Bayer pattern as there are red or blue pixels. The green pixels form a checkerboard pattern with green pixels on every line, but the red or blue pixels form a more open pattern with pixels only on alternating lines.

The interpolation filter for green is:

$$\begin{matrix} 1/8 & 1/4 & 1/8 \\ 1/4 & 1/2 & 1/4 \\ 1/8 & 1/4 & 1/8 \end{matrix}$$

which is a 3×3 kernel that can be separated into a 3×1 kernel and a 1×3 kernel:

$$\begin{bmatrix} 1/8 & 1/4 & 1/8 \\ 1/4 & 1/2 & 1/4 \\ 1/8 & 1/4 & 1/8 \end{bmatrix} = \begin{bmatrix} 1/4 \\ 1/2 \\ 1/4 \end{bmatrix} * [\,1/2 \quad 1 \quad 1/2\,]$$

The 3×1 kernel is implemented as a vertical interpolation step that multiplies the pixel above by ¼ and the pixel below by ¼, while the current pixel location is multiplied by ½. The 1×3 kernel becomes a horizontal interpolation step that multiplies the pixel on the left by ½ and the pixel to the right by ½, while the current pixel location is multiplied by 1. Since half of the locations in a Bayer pattern are missing green values, not all of the kernel coefficients are used to calculate a pixel's green value.

The interpolation filter for red and blue is:

$$\begin{matrix} 1/4 & 1/2 & 1/4 \\ 1/2 & 1 & 1/2 \\ 1/4 & 1/2 & 1/4 \end{matrix}$$

which is a 3×3 kernel that can be separated into a 3×1 kernel and a 1×3 kernel:

$$\begin{bmatrix} 1/4 & 1/2 & 1/4 \\ 1/2 & 1 & 1/2 \\ 1/4 & 1/2 & 1/4 \end{bmatrix} = \begin{bmatrix} 1/2 \\ 1 \\ 1/2 \end{bmatrix} * [\,1/2 \quad 1 \quad 1/2\,]$$

The 3×1 kernel is implemented as a vertical interpolation step that multiplies the pixel above by ½ and the pixel below by ½, while the current pixel location is multiplied by 1. The 1×3 kernel becomes a horizontal interpolation step that multiplies the pixel on the left by ½ and the pixel to the right by ½, while the current pixel location is multiplied by 1. Since only one-quarter of the locations in a Bayer pattern contain red (blue) values, not all of the kernel coefficients are used to calculate a pixel's red (blue) value.

Horizontal adders 40 perform the horizontal interpolation for green, red, and blue for a current pixel location and some of the immediately surrounding pixel locations. The results are stored in column register 32. Column register 32 contains color components for just one column. Horizontal adders 40 calculate the green components for 5 lines of this column, while red and blue components are calculated for only 3 lines of this column. Thus column register 32 stores color components for a small region of the image.

These color components are not complete, since only the horizontal kernel has been applied to the pixels from line buffer 30. Vertical adders 50 perform the vertical interpolation from the horizontal results stored in column register 32, using the vertical kernels for green and red/blue. All three color components for a current pixel are generated by vertical adders 50, and this RGB value is stored in RGB register 34. The current pixel is a pixel in the third of the four lines from line buffer 30, and in the column from column register 32.

The green components for the line above and line below the current pixel are also generated by vertical adders 50. Thus the green components are generated for three lines of the column stored in column register 32. The green values are stored in green register 34'.

The RBG value for the currently-processed pixel from RGB register 34 is converted to YUV format by YUV converter 60. Color enhancer 38 receives the 2 chromatic values (U and V) and multiplies these values by a filter value to enhance certain colors. The enhanced U and V value for the current pixel is then output for display, storage, or compression.

The green values from green register 34' are used for edge detection. The last set of green values for the previous 2 columns are stored in pipeline registers 64, so that a total of 9 green values are stored (three lines by three columns). An edge can be detected from the current (middle) pixel by comparison to the 8 surrounding pixels. When a difference above a threshold value is detected, and edge is signaled by edge detector 62. Edge enhancer 36 is then activated. Edge enhancer 36 receives the luminance (Y) value from YUV converter 60 for the current pixel, and simply outputs the Y value when no edge is detected. When edge detector 62 detects an edge, edge enhancer 36 multiplies the Y value by a filter to increase or decrease the brightness of the pixel, thereby enhancing or sharpening the edge.

The pipeline delay through pipeline registers 34' and edge detector 62 matches the pipeline delay through RGB register 34 and YUV converter 60, so that the same current pixel is edge detected and YUV-converted. Thus edge detection and YUV conversion occur simultaneously for the same pixel. Horizontal adders 40 and vertical adders 50 interpolate for both RGB-YUV conversion and edge detection. Green values are calculated for two additional lines so that edge detection can also be performed using the intermediate results. Edge enhancement and color enhancement are also performed at the same time on the same pixel by color enhancer 38 and edge enhancer 36.

By performing a few additional calculations, interpolator 41 provides inputs to edge detector 62 as well as the current RGB value. Simultaneous edge detection is then possible using the same pipeline. Edge detection is performed on the green values rather than on the Y values so that edge detection can occur earlier in the pipeline.

Figure 4:
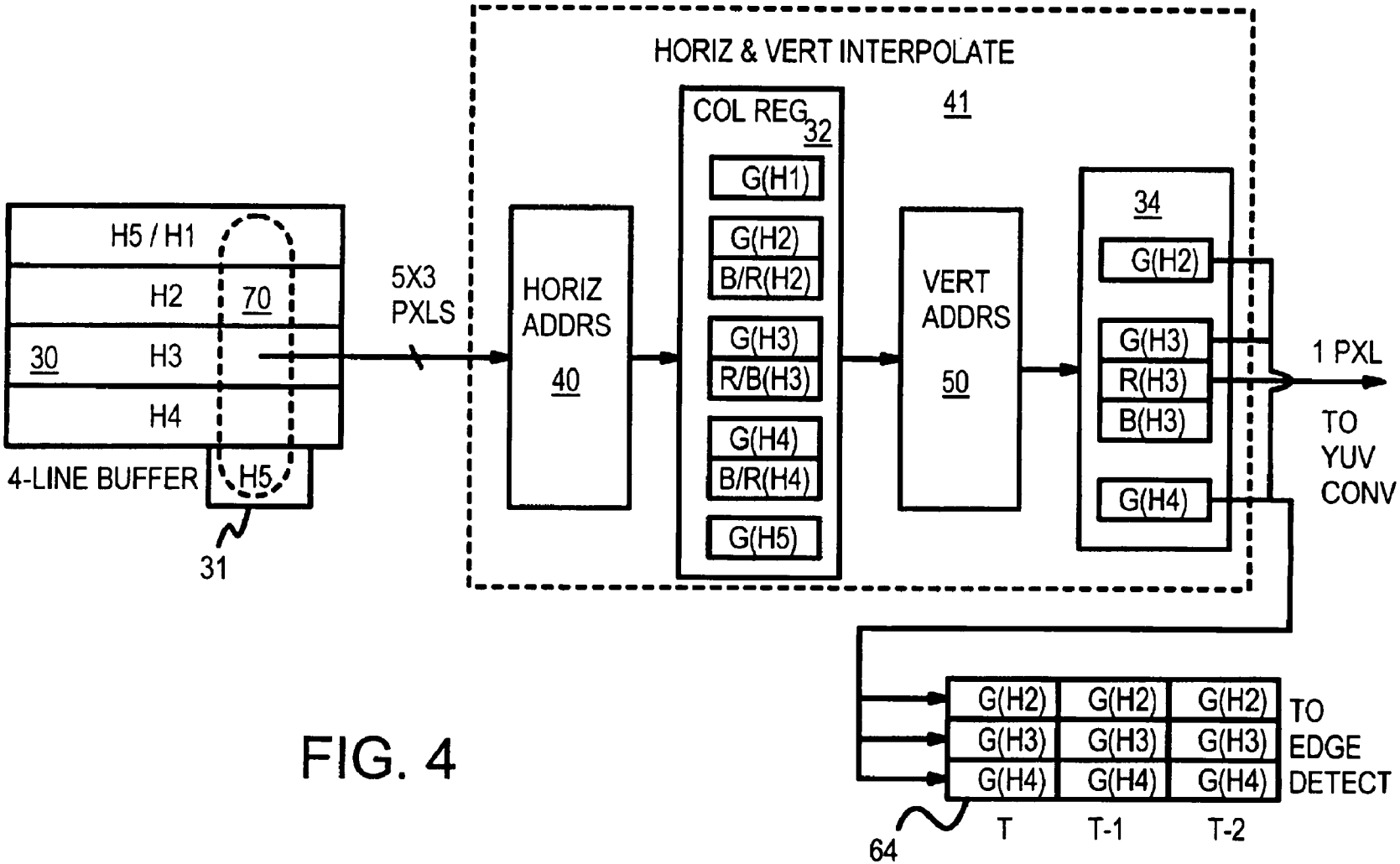
FIG. 4 highlights data storage within the merged interpolation/edge detection pipeline.

Data Storage in Merged Pipeline—FIG. 4

FIG. 4 highlights data storage within the merged interpolation/edge detection pipeline. Line buffer 30 is fed a stream of mono-color pixels from the sensor that have been multiplied by a color-specific gain for white balance. These pixels arrive in a Bayer pattern, from left to right filling each line, and from upper lines to lower lines until the entire frame is received.

The most-recently-received four lines are stored in line buffer 30 for the preferred embodiment. Horizontal lines H1, H2, H3, and H4 have been stored in the four lines of line buffer 30. Horizontal line H5 is currently being received from the sensor and white balancer. Pixels along line H5 replace line Hi pixels in the first row of line buffer 30. Thus pixels to the left of the first row are from line H5 while pixels to the right are from the older line H1.

A small overlapping region occurs in a current column 70. Pixels received from the sensor are first stored in a small temporary buffer 31 in line buffer 30. Temporary buffer 31 contains a few pixels that have just been received from the sensor. Pixels in the current column 70 and in the 2 surrounding columns of oldest line H1 are not discarded immediately, but instead are sent to interpolator 41. Using temporary buffer 31 to store new pixels from line H5 allows for 5 lines of pixels (H1 to H5) to be sent to interpolator 41 for current column 70. Pixels from oldest line Hi are discarded after being sent to interpolator 41.

Current column 70 includes the actual current column and two adjacent columns, for five horizontal lines. A region of 5×3 pixels is sent from line buffer 30 to interpolator 41 for each clock cycle. This 5×3 region provides enough pixels for interpolation of a current pixel location's RGB values, and green values for the pixels immediately above and below the current pixel location. Thus edge detection values are also generated by interpolator 41.

Horizontal adders 40 receive the 5×3 array of pixel values and perform horizontal interpolation on some of the values, as shown later in FIGS. 6A, 6B. Horizontal adders include shift logic to weight values from line buffer 30 before addition so that the proper sums are generated. For example, a pixel value that should be weighted by ¼ can be shifted to the right by 2 bit positions before addition.

Horizontal adders produce green values for all five lines, which are stored in column register 32 as G(H1), G(H2), G(H3), G(H4), G(H5). G(H3) is the green value for the current pixel, which is line 3 of the current column. Green values for two pixels above and two pixels below the current line are stored for edge detection.

Red and Blue values are generated and stored for the current line and for the line above and the line below the current line. Since the Bayer pattern alternates lines with red and blue pixels, the values stored in column registers 32 alternates. For example, for one column B(H2) and B(H4) are stored with R(H3), while in the next clock cycle for the next column (pixel) R(H2) and R(H4) are stored with B(H3). The same register in column register 32 can store B(H2) one cycle and R(H2) the next cycle. Thus a total of 5 green values and 3 blue/red values are stored in the 8 registers in column register 32.

Vertical interpolation adds weighted color values from only one column. Thus the color values from column register 32 contain enough information to apply the vertical interpolation filters. Vertical adders 50 receive the R, G, and B values from column register 32, perform shifts to apply the weightings of the vertical filters, and then generate sums. Vertical adders 50 perform vertical interpolation as shown later in FIGS. 7A, 7B.

The R, G, and B values for the current pixel in line H3 are all generated and stored in RGB register 34. The green values for the lines H2 and H4 are also calculated by vertical adders 50 and stored in register 34. The RGB values for line H3 are output to the YUV converter, while the G values for lines H2, H3, and H4 are output to the edge detector.

The three G values for lines H2, H3, H4 are stored in pipeline register 64 for the next 2 clock cycles, while the next 2 pixels are generated in line H3. Pipeline register 64 thus stores a 3×3 array of green values, for 3 lines and 3 columns. An edge can be detected by a sudden change in green value from the middle pixel to one or more of the 8 surrounding green values. Since YUV conversion requires a clock delay, by the time the YUV values are available, the current pixel is in the middle of the 3×3 array of pipeline register 64.

Pipeline delays cause the meaning of the "current" pixel to change in each pipeline stage (pipestage). For example, the pixel being converted from RGB to YUV is one pixel (column) to the right (ahead) of the "current" column of pixels being added by vertical adders 50, and two pixels (columns) to the right of the "current" column of pixels being added in horizontal adder 40. The "current" pixel being edge and color enhanced is one column to the left of the pixel in the YUV converter stage.

Bayer Pattern From Line Buffer—FIG. 5

Figure 6A:
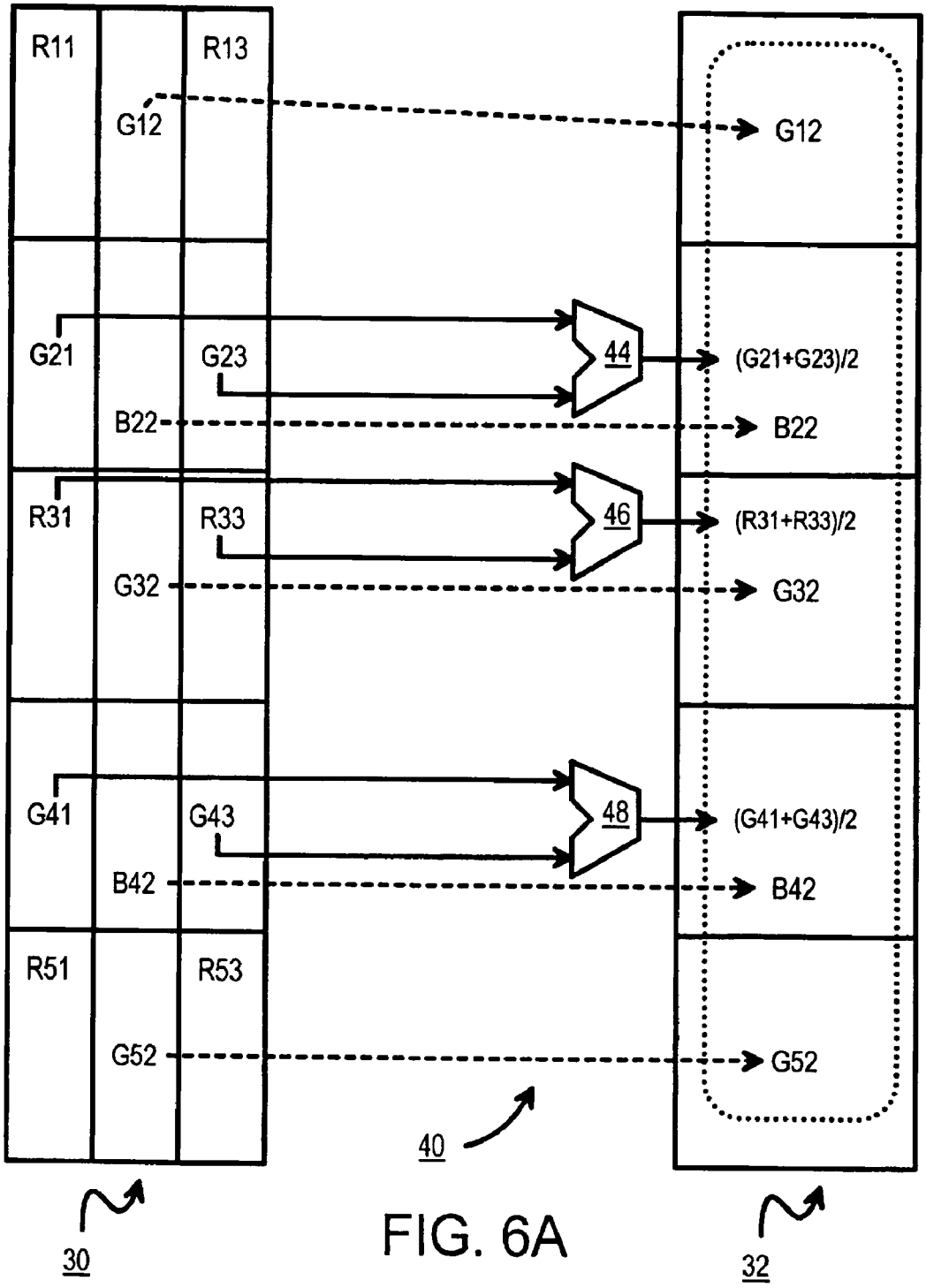
FIG. 6A shows horizontal interpolation when the current pixel is a green pixel on a red-green line in the Bayer pattern.
Figure 6B:
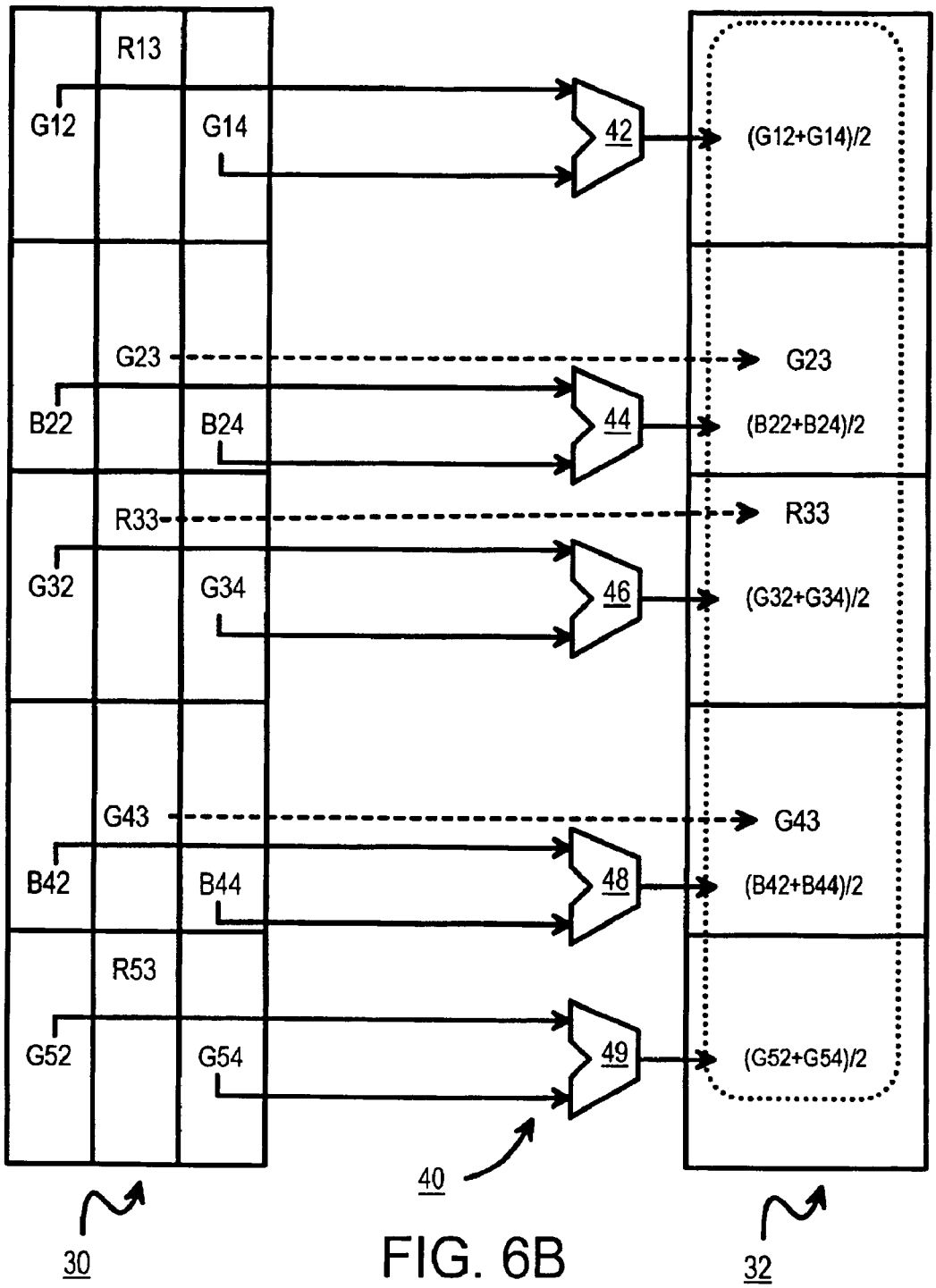
FIG. 6B shows horizontal interpolation when the current pixel is a red pixel on a red-green line in the Bayer pattern.
Figure 7A:
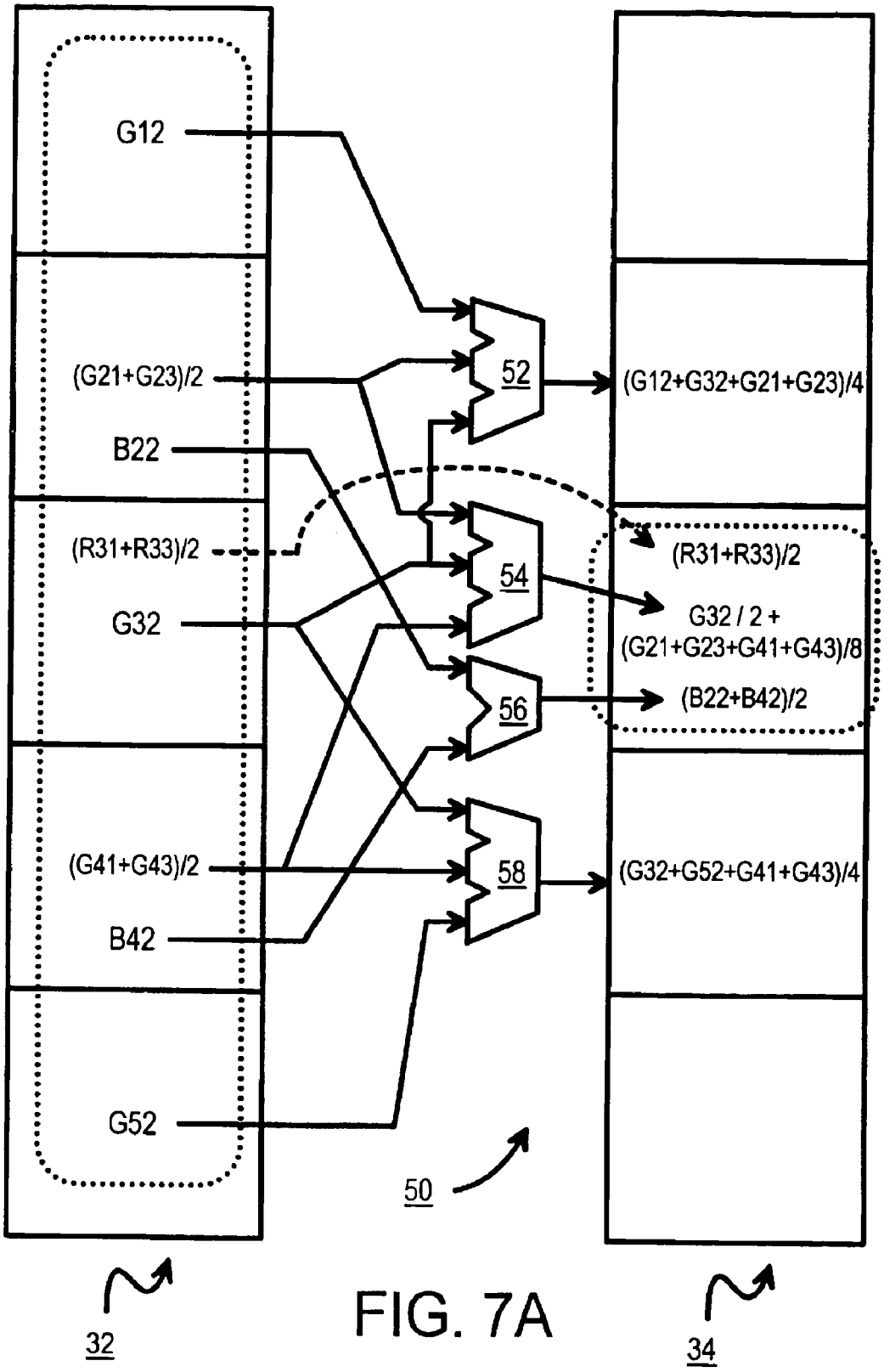
FIG. 7A shows vertical interpolation when the current pixel is a green pixel on a red-green line in the Bayer pattern.
Figure 7B:
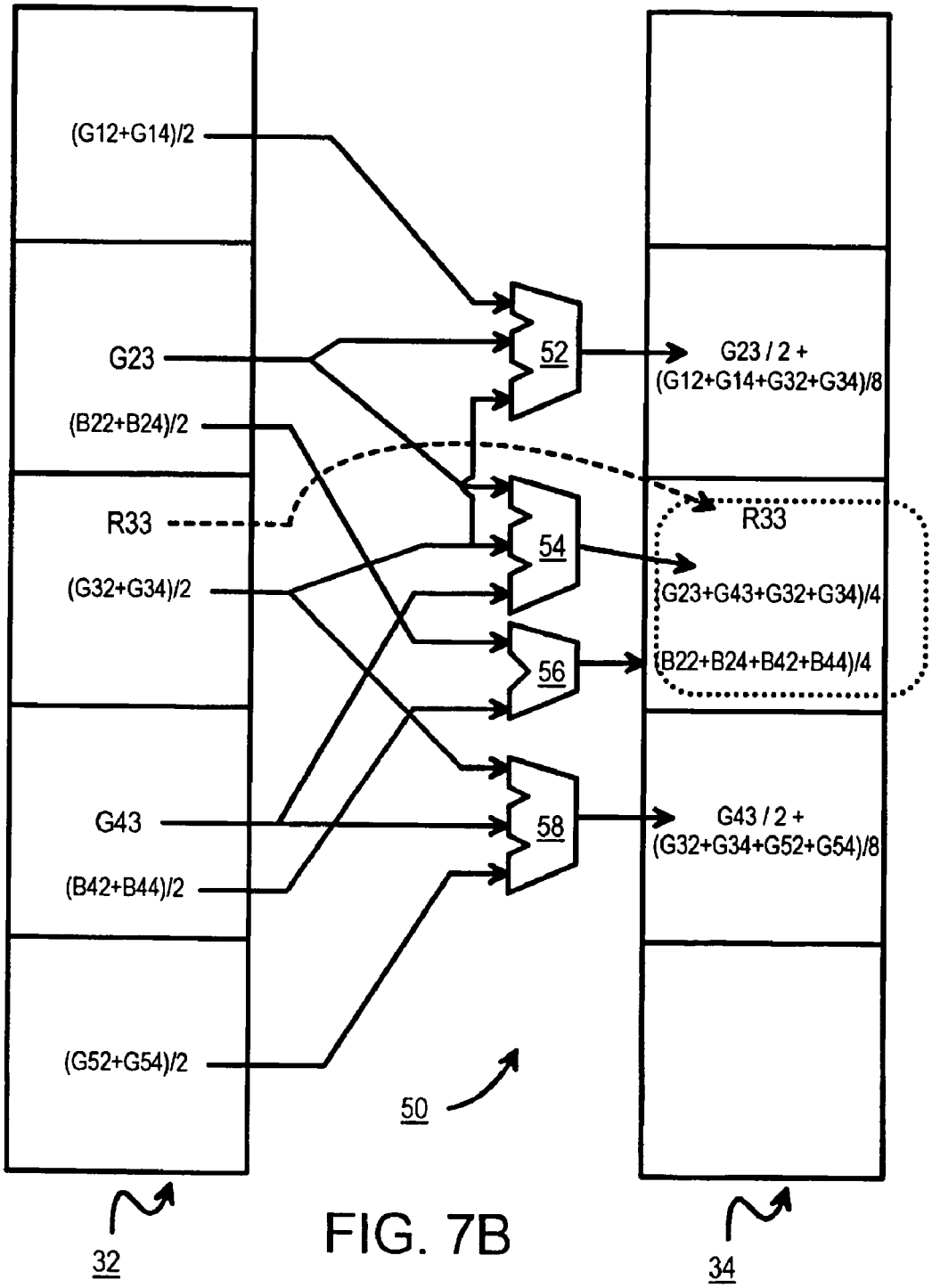
FIG. 7B shows vertical interpolation when the current pixel is a red pixel on a red-green line in the Bayer pattern.

FIGS. 5-7 show interpolation over two clock cycles for two pixels. The alternating nature of the Bayer pattern requires 2 different operations in alternating clock cycles. FIG. 5 shows the Bayer-pattern input from buffer 30, while FIGS. 6A, 6B show horizontal interpolation on those values. FIGS. 7A, 7B show vertical interpolation on the intermediate results stored in the column register.

FIG. 5 shows two successive 5×3 arrays of Bayer-pattern pixels from the line buffer which are input to the horizontal interpolator during 2 clock cycles. The Bayer pattern alternates green pixels with red pixels on odd lines, while alternating green pixels with blue pixels on even lines.

In FIG. 5, line H1 is the upper line, while line H5 is the bottom line. The current pixel is on line H3 and is in the second column for a first clock cycle, but moves to the third column for the next clock cycle. The current pixel moves to the right along the current row for each clock cycle. Once all pixels in a line have been processed, the lines (or line pointers) are moved up in the line buffer.

The subscripts shown with the pixels indicate the row and column. For example, the current pixel in the first clock cycle is in line H3, column 2, which contains G32 from the Bayer-pattern input. The next current pixel at row 3, column 3 has just a red value—R33. The Blue and green components for pixel 3,3 must be interpolated.

For the first clock cycle, pixel R32 is the current pixel. A 5×3 array of pixel values are sent from line buffer 30 to the horizontal adders. This 5×3 array includes the first three columns and all 5 lines. R11, G12, and R13 are sent from the first line, G21, B22, G23 are sent from the second line, R31, G32, and R33 from the third line, G41, B42, G43 from the fourth line, R51, G52, and R53 from the fifth line. In the next clock cycle, when R33 becomes the current pixel, the second, third, and fourth columns of all five lines are sent from line buffer 30 to the horizontal adders. The 5×3 pixel array includes G12, R13, G14 from line H1, B22, G23, B24 from line H2, G32, R33, G34 from line H3, B42, G43, B44 from line H4, and G52, R53, G54 from line H5.

Horizontal Interpolation—FIGS. 6A, 6B

FIG. 6A shows horizontal interpolation when the current pixel is a green pixel on a red-green line in the Bayer pattern. The current column is 2 and the current row is 3. The green value G32 in the third line is the current pixel that will have the full RGB value generated by interpolation. The 5×3 array of pixel values sent from line buffer 30 (FIG. 5) is shown on the left of FIG. 6A.

The green values of the first and fifth lines are already available from the Bayer pattern and are simply copied to column register 32 as G12, G52. The G value from the third line, G32, is also copied to column register 32. The blue values are available for pixels 2,2 and 4,2, so these are copied from line buffer 30 to column buffer 32 as B22, B42.

The red value for the current pixel at 3,2 is not available and must be computed from the surrounding red values. Since horizontal interpolation is being performed, only red values from the same row are added. The red values R31, R33 to the right and left of location 3,2 are shifted to the right by one binary position to weight these by ½. The shifted R31, R33 are input to adder 46, producing the (R31+R33)/2. This is the intermediate R32 value after horizontal interpolation but before vertical interpolation.

Green values for locations 2,2 and 4,2 are also not available and must be interpolated. Again, only green values from the same horizontal line are added by horizontal adders 40. Green values G21, G23 are right-shifted by one bit and input to adder 44, which outputs (G21+G23)/2 as the intermediate G22 stored in column register 32. Green values G41, G43 are right-shifted by one bit and input to adder 48, which outputs (G41+G43)/2 as the intermediate G42 stored in column register 32. Column register 32 contains 5 green values, two of which were generated by adders 48. A red value was generated by adder 44, and 2 blue values were copied over. A total of 8 color components are stored in column register 32 for 5 pixels in one column.

FIG. 6B shows horizontal interpolation when the current pixel is a red pixel on a red-green line in the Bayer pattern. This occurs for the next clock cycle after the calculations of FIG. 6A. The operations of FIGS. 6A, 6B alternate with each successive pixel in a red-green line.

The current column is 3 and the current row is 3. The red value R33 in the third line is the current pixel that will have the full RGB value generated by interpolation. The 5×3 array of pixel values sent from line buffer 30 (FIG. 5) is shown on the left of FIG. 6B. This 5×3 array has shifted to the right by one column. A column pointer in line buffer 30 can be used to point to the next 5×3 array to read.

The red values of the first, third, and fifth lines are already available from the Bayer pattern, however, only green values are needed for the first and last lines, so R13 and R53 are discarded. R33 is simply copied to column register 32. The green values are available for pixels 2,2 and 4,2, so these are copied from line buffer 30 to column buffer 32 as G23, G43.

The green value for the current pixel at 3,3 is not available and must be computed from the surrounding green values. Since horizontal interpolation is being performed, only green values from the same row are added. The green values G32, G34 to the right and left of location 3,3 are shifted to the right by one binary position to weight these by ½. The shifted G32, G34 are input to adder 46, producing the (G32+G34)/2. This is the intermediate G33 value after horizontal interpolation but before vertical interpolation.

Green values for the first and last row must also be generated by adders 42, 49 in the same manner. Column register 32 stores (G12+G14)/2 as intermediate G13 and (G52+G54)/2 as the intermediate G53.

Blue values for locations 2,3 and 4,3 are also not available and must be interpolated. Again, only blue values from the same horizontal line are added by horizontal adders 44, 48.

Blue values B22, B24 are right-shifted by one bit and input to adder 44, which outputs (B22+B24)/2 as the intermediate B23 stored in column register 32. Blue values B42, B44 are right-shifted by one bit and input to adder 48, which outputs (B42+B44)/2 as the intermediate B43 stored in column register 32.

Column register 32 contains 5 green values, three of which were generated by adders 42, 46, 49. Two blue values were generated by adders 44, 48, and 1 red value was copied over. A total of 8 color components are stored in column register 32 for 5 pixels in one column. The same registers and adders are thus used for different color components for alternating cycles. A similar but somewhat different pair of operations occurs for green-blue lines than was shown for FIGS. 6A, 6B, where 5 green lines and alternating red and blue components are generated for the middle 3 lines.

Vertical Interpolation—FIGS. 7A, 7B

FIG. 7A shows vertical interpolation when the current pixel is a green pixel on a red-green line in the Bayer pattern. FIG. 7A receives a 1×5 array of pixels generated by the horizontal interpolation of FIG. 6A and stored in column register 32.

The current column is 2 and the current row is 3. The green value G32 in the third line is the current pixel that will have the full RGB value generated by interpolation. The 1×3 array of pixel values stored by the horizontal interpolator into column register 32 (FIG. 6A) is shown on the left of FIG. 7A. Since vertical interpolation is being performed, only one column of pixels is needed as an input.

The green values for the second and fourth rows are calculated by adders 52, 58. The green values G12, G32 are input to adder 52 after being right-shifted by 2 binary bits (multiplied by one quarter). The intermediate value for G22 (calculated as (G21+G23)/2 by the horizontal adder) is right-shifted by one bit before input to adder 52, which generates the sum (G12+G32+G21+G23)/4, which is the final interpolated value for G22.

Likewise, the green values G32, G52 are input to adder 58 after being right-shifted by 2 binary bits (multiplied by one quarter). The intermediate value for G42 (calculated as (G41+G43)/2 by the horizontal adder) is right-shifted by one bit before input to adder 58, which generates the sum (G32+G52+G41+G43)/4, which is the final interpolated value for G42.

The red value for location 3,2 has already been calculated during horizontal interpolation as (R31+R32)/2. This value is copied from column register 32 to RGB register 34 as the R value. Vertical interpolation is not needed since there are no red values in the lines above and below the current line.

The blue value for location 3,2 is generated by adder 56 by adding B22 and B42 after right-shifting by one bit. The blue value saved in RGB register 34 is (B22+B42)/2, representing the interpolated B32.

Adder 54 calculates the final green value for the current pixel, G32. According to the vertical filter for green, the G32 value from column register 32 is combined with the interpolated green values above and below the current location. G32 from column register 32 is right-shifted by one bit (divide by 2) and input to adder 56 along with the intermediate G22, (G21+G23)/2, and the intermediate G42, (G41+G43)/2, each right-shifted by two bit-positions for a divide by four. The result from adder 56 is:

G32/2+(G21+G23+G41+G43)/8.

Thus the R, B, and G values for the current pixel location (3,2) are calculated and stored in RGB register 34, while the G values above and below the current location (G22 and G42) are also stored for edge detection.

FIG. 7B shows vertical interpolation when the current pixel is a red pixel on a red-green line in the Bayer pattern. FIG. 7B receives a 1×5 array of pixels generated by the horizontal interpolation of FIG. 6B and stored in column register 32. The operation of FIG. 7B occurs for the next clock cycle after the calculations of FIG. 7A. The operations of FIGS. 7A, 7B alternate with each successive pixel in a red-green line. Similar calculations are performed for blue-green lines.

The current column is 3 and the current row is 3. The green value G33 in the third line is the current pixel that will have the full RGB value generated by interpolation. The 1×3 array of pixel values stored by the horizontal interpolator into column register 32 (FIG. 6B) is shown on the left of FIG. 7B.

The green values for the second and fourth rows are calculated by adders 52, 58. According to the vertical filter for green, the G23 value from column register 32 is combined with the interpolated green values above and below the current location. G23 from column register 32 is right-shifted by one bit (divide by 2) and input to adder 52 along with the intermediate G13, (G12+G14)/2, and the intermediate G33, (G32+G34)/2, each right-shifted by two bit-positions for a divide by four. The result from adder 52 is:

G23/2+(G12+G14+G32+G34)/8.

For the fourth line, G43 from column register 32 is right-shifted by one bit (divide by 2) and input to adder 58 along with the intermediate G33, (G32+G34)2, and the intermediate G53, (G52+G54)/2, each right-shifted by two bit-positions for a divide by four. The result from adder 58 is:

G43/2+(G32+G34+G52+G54)/8.

The red value for location 3,3 is available from the Bayer-pattern input as R33. This value is copied from column register 32 to RGB register 34 as the R value. Vertical interpolation is not needed since there are no red values in the lines above and below the current line.

The blue value for location 3,3 is generated by adder 56 by adding the intermediate B23 and B43 after right-shifting by one bit. The blue value saved in RGB register 34 is (B22+B24+B42+B44)/4, representing the interpolated B33.

Adder 54 calculates the final green value for the current pixel, G33. G23 and G43 are right-shifted by one bit and input to adder 54, while the intermediate result for G33, (G32+G34)/2, is also right-shifted by one bit and input to adder 54. The sum from adder 54 is (G23+G32+G34+G43)/4, the interpolated value for G33.

The R, B, and G values for the current pixel location (3,3) are calculated and stored in RGB register 34, while the G values above and below the current location (G23 and G43) are also stored for edge detection.

Figure 8:
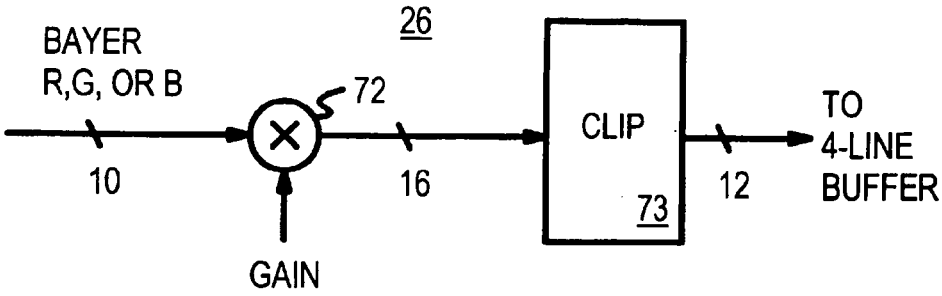
FIG. 8 is a diagram of a white-balancing unit that performs white balancing on Bayer-pattern pixels before the line buffer.

White Balancer—FIG. 8

FIG. 8 is a diagram of a white-balancing unit that performs white balancing on Bayer-pattern pixels before the line buffer. White balancing is performed by multiplying each mono-color pixel by a gain. Three gains are used: one for red, another for blue, and the third for green pixels. Since the pixels from the sensor are in a Bayer pattern, each pixel contains only one of the three primary colors.

Multiplier 72 in white balancer 26 receives the mono-color pixels from the sensor after the A/D converter. The pixels can be in a format of either 8, 9, or 10 bits per mono-color pixel. Multiplier 72 multiplies green pixels by the green gain, red pixels by the red gain, and blue pixels by the blue gain. A simple sequencer can apply the proper gain to multiplier 72. For example, the red and green gain can be alternately applied to pixels in the first and all odd lines, while the green and blue gain is alternately applied to the second line and all even lines.

Multiplier 72 outputs a 16-bit result. Clipper 73 clips the 16-bit result from multiplier 72 to a 12-bit value that is stored in the line buffer and later interpolated. The gains applied to multiplier 72 have 12 bits in a 4.8 format—four bits of integer and an 8-bit fraction.

The three gains applied to multiplier 72 can simply be numbers stores in 3 programmable registers. The gains can be constants determined by the sensor and known or assumed lighting conditions.

In more complex embodiments, the gains are calculated from a previous frame of Bayer-pattern data and applied to the current frame. Averages for each color (R, G, B) are generated for all pixels in a frame or a range within the frame. The frame can be divided into several regions and the averages calculated for each region. Regions with averages that are far away from the average for all regions can be discarded.

The white-balance calculator also finds the maximum values for each of the three color components over the frame. The gains are then the maximum value divided by the average for each color. Many clock cycles can be used to generate these averages and gains, so a small adder/subtractor can be used recursively.

Figure 9:
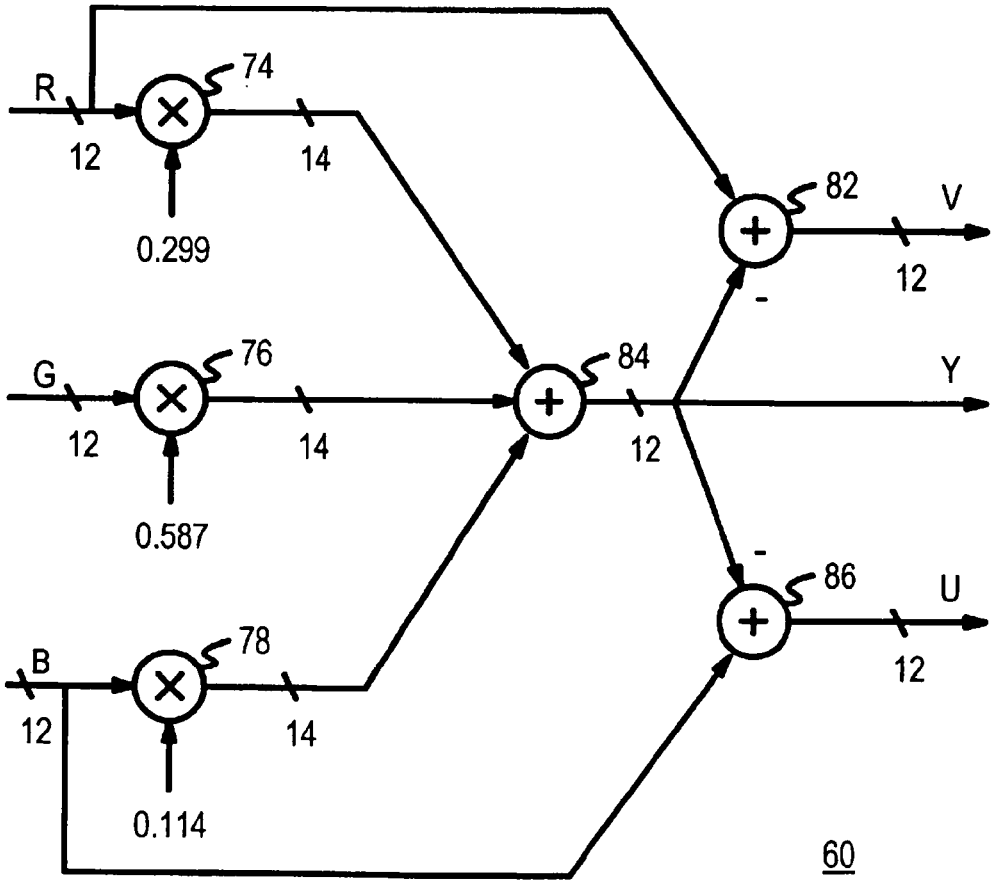
FIG. 9 is a diagram of a RGB-to-YUV converter.

YUV Converter—FIG. 9

FIG. 9 is a diagram of a RGB-to-YUV converter. YUV converter 60 receives the RGB value from the RGB register that is loaded by the vertical interpolator. YUV conversion is a standard operation.

Each color component is first multiplied by a constant. The red component is multiplied by 0.299 decimal using multiplier 74. The blue component is multiplied by 0.141 decimal using multiplier 78, while the green component is multiplied by 0.587 decimal by multiplier 76. Of course, the decimal numbers are converted to 8-bit binary values before being applied to the multiplier.

The 14 most-significant-bits (MSBs) from multipliers 74, 76, 78 are sent to adder 84. Adder 84 generates the sum of all three color components, which is the overall luminance Y. A 12-bit value is output by adder 84 and any carry-out is ignored.

Adders 82, 86 subtract the luminance Y from the original R and B values, respectively, to produce the V and U chromatic values. The carry-out is the sign bit, which is appended to an 11-bit output to produce a 12-bit value in two's complement.

Figure 10:
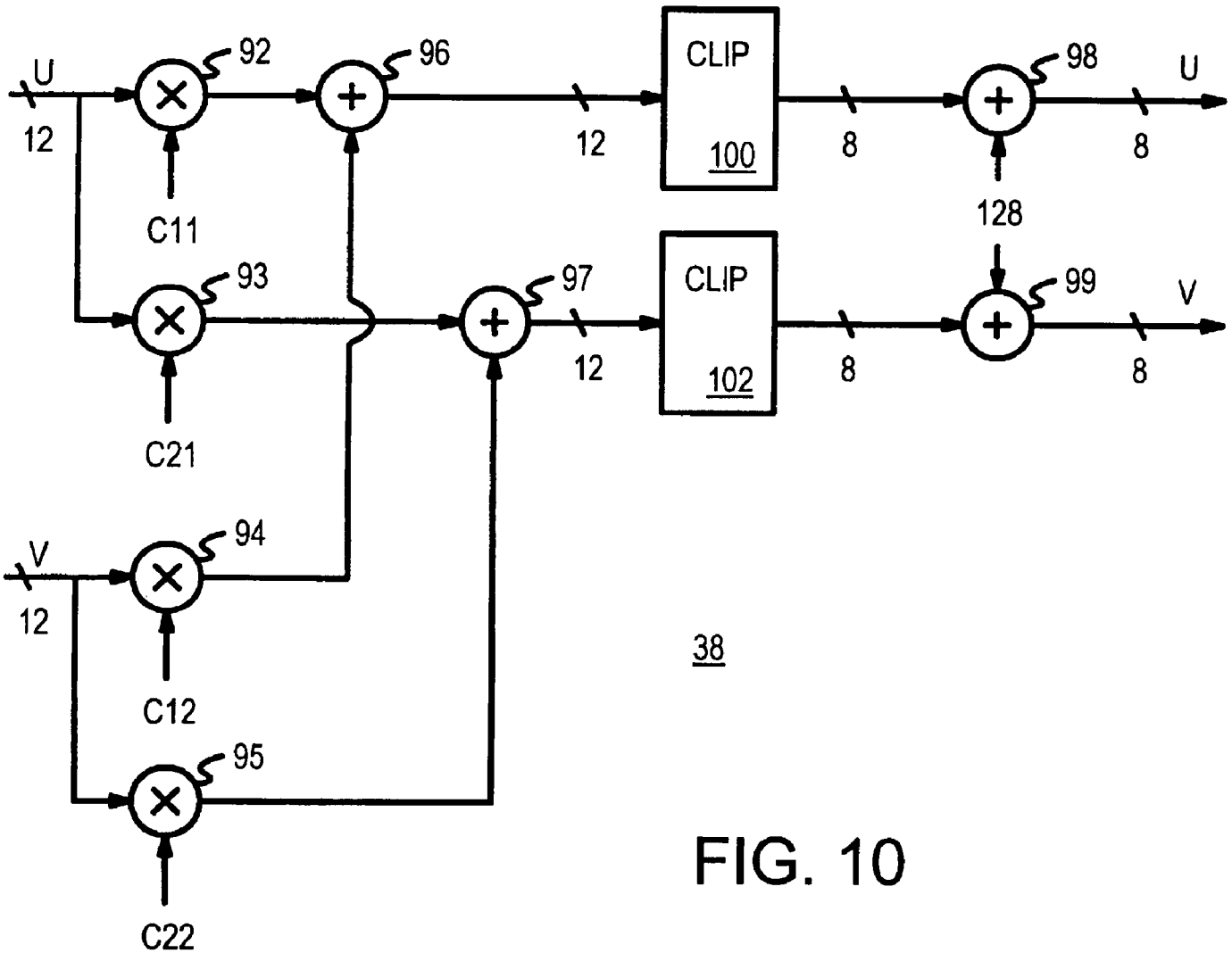
FIG. 10 is a diagram of a color enhancer.

Color Enhancer—FIG. 10

FIG. 10 is a diagram of a color enhancer. Hue and saturation are adjusted with color enhancer 38. The V and U color values are multiplied by a 2×2 matrix to enhance the color after YUV conversion is completed. The 2×2 matrix is stored as four programmable registers, each with a s.2.5 format (1 sign bit, 2 integer bits, 5 fraction bits). The matrix contains the constants c11, c21, which are multiplied by U in multipliers 92, 93, and constants c12, c22, which are multiplied by V with multipliers 94, 95. In one example, c11 and c22 are 0.5 decimal, and c12 and c21 are zero.

Adder 96 then sums the products from multipliers 92, 94, producing a 12-bit value that is clipped to an 8-bit value (between −128 and 127) by clipper 100. Adder 97 then sums the products from multipliers 93, 95, also producing a 12-bit value that is clipped to an 8-bit value by clipper 102. Adders 98, 99 then add 128 to the clipped values, shifting the results, which are output as the enhanced U and V values.

Edge Detection

Edge detection is performed with a 3×3 filter. The 3×3 filter operates on the 3 columns of 3 lines of pixels in the pipeline register. Only the green values are used for edge detection since there are twice as many green pixels as red or blue pixels in the Bayer-pattern input. The following non-separable filter may be multiplied by the 9 green values in the pipeline register:

$$\begin{matrix} -1 & -1 & -1 \\ -1 & 8 & -1 \\ -1 & -1 & -1 \end{matrix}$$

The absolute value of the output of the filter is then compared to a register-programmable threshold. When the absolute value of the filter output exceeds the threshold, then the edge enhancer is activated. The edge enhancer multiplies the edge by a scaling factor. The scaling factor is also register-programmable. The result of the edge-scaling factor multiply is then added to the current Y value, for the pixel in the middle of the pipeline register. The result may then be clipped to 12 bits.

The following filter may also be used. Since this filter is separable into horizontal and vertical filters, it may be easier to implement:

$$\begin{bmatrix} 1 & -2 & 1 \\ -2 & 4 & -2 \\ 1 & -2 & 1 \end{bmatrix} = \begin{bmatrix} -1 \\ 2 \\ -1 \end{bmatrix} * [-1 \quad 2 \quad -1]$$

This operation requires 8 or 4 operations for each pixel being edge detected. Other filters can also be used that amplify differences between adjacent pixels.

ADVANTAGES OF THE INVENTION

A digital-camera processor does not use a whole-frame buffer. It performs color interpolation of Bayer-pattern pixels without storing all the pixels in a frame. Smaller line buffers are used, which store only a few lines of pixels rather than all 600 lines in a SVGA image. Both color interpolation and edge detection are performed at the same time, using integrated hardware. The edge detector is merged into the same pipeline as the interpolator. White balance, edge enhancement, YUV conversion and color enhancement are also performed without using a whole-frame buffer. All pixels in a frame are processed in a single pass, without storing all the pixels.

Only 2 to 4 lines of the 600 or more lines need to be stored in the line buffer, providing a memory savings of better than 99%. The unified pipeline and line buffer can be integrated together on a single substrate. The chip can be all-digital since white balance, interpolation, YUV conversion, edge detection and enhancement are all performed digitally. Since the edge detection is tightly integrated with the interpolation pipeline, a separate multi-line buffer between the interpolator output and the edge-detector input is not needed.

ALTERNATE EMBODIMENTS

Several other embodiments are contemplated by the inventors. The invention has been described as interpolating for locations that already have green values in the Bayer pattern. This produces a smoother color. However, it is possible to skip interpolation for locations that already have green values. The small temporary buffer in the line buffer can be expanded, and can receive either the newest pixels or the oldest pixels in the line buffer. The size of the line buffer can also be varied for different horizontal resolutions, and for different edge-detection areas. For example, the edge-detection filter can use a 1×3 kernel instead of a 3×3 kernel. For a 1×3 kernel, edge detection is performed within one horizontal line. Then only 2 full lines need to be stored in the line buffer, plus the temporary buffer with the data for a small portion of a third line. In general, when the edge-detection filter operates on n lines, the line buffer must store n+1 full lines.

Different segmentation of the pipeline can be substituted, depending on logic delays in each pipestage. Rapid clocking and slow adders may require 2 clock cycles for each adder in the interpolator, or slower clocks and faster logic may allow both horizontal and vertical adders to operate in a single pipestage without actually latching in the intermediate values. Similar adjustments and modifications can be made to other stages and functional units.

Different data encodings and primary colors can be used. Bit widths can be varied. Many data formats may be used with the invention. Additional functions can be added. Many arrangements of adders, shifters, and logic units are possible. Adders may be reused or used recursively. Some image sensors may alter the Bayer pattern in different ways, such as by producing data from lower lines before upper lines. Various modifications can be made as needed.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A digital-image processor comprising:

a line buffer, receiving mono-color pixels captured by an image sensor, the line buffer for storing only a fraction of a whole frame of an image, the fraction being less than 5 percent of a number of pixels in the whole frame;

a merged pipeline, receiving an array of mono-color pixels from the line buffer, for generating missing color values for a middle pixel, the middle pixel being a mono-color pixel in a middle of the array from the line buffer;

the merged pipeline also for generating an upper primary color value for an upper pixel immediately above the middle pixel and a lower primary color value for a lower pixel immediately below the middle pixel;

an edge detector, receiving the upper primary color value and the lower primary color value and a primary color value for the middle pixel, the edge detector for detecting an edge between the middle pixel and a neighboring pixel; and an edge enhancer, activated by the edge detector when the edge is detected, for increasing a magnitude of the middle pixel when the edge is detected;

the merged pipeline outputting interpolated color values for the middle pixel, whereby interpolation and edge detection are performed by the merged pipeline using the line buffer.

2. The digital-image processor of claim 1 further comprising:

a color-space converter, coupled to receive the middle pixel including the missing color values generated by the merged pipeline, for converting color values into luminance and chromatic values;

wherein the edge enhancer increases the luminance value of the middle pixel when activated.

3. The digital-image processor of claim 2 wherein the color-space converter converts from red, green, blue RGB color values to luminance and chromatic YUV values representing a color of a pixel.

4. The digital-image processor of claim 3 wherein the edge detector receives green color values, the edge detector performing edge detection using green values, but the edge enhancer sharpening edges by adjusting the luminance value of the middle pixel.

5. The digital-image processor of claim 1 wherein the merged pipeline further comprises:

a horizontal interpolator, receiving the array from the line buffer, for averaging mono-color pixels within a same horizontal line to produce intermediate color values;

a column register, coupled to receive the intermediate color values from the horizontal interpolator, for storing intermediate color values for a single column of pixels in the array; and a vertical interpolator, receiving the intermediate color values from the column register, for averaging intermediate color values within a same single column of pixels, the vertical interpolator outputting RGB color values for the middle pixel, the vertical interpolator also outputting G values as the upper and lower primary color values to the edge detector, wherein horizontal and vertical interpolation are performed separately.

6. The digital-image processor of claim 5 wherein the array received by the merged pipeline from the line buffer shifts by one pixel to the right along a line for each clock cycle, the array containing at 3 columns of mono-color pixels from at least 5 lines;

wherein the line buffer stores 4 lines of mono-color pixels.

7. The digital-image processor of claim 6 wherein the column register includes one green register for each of at least 5 lines, the column register also including at least 3 shared registers for a middle line containing the middle pixel and an upper and a lower line immediately above and below the middle line;

wherein the shared registers alternately store red and blue color values for alternate clock cycles.

8. The digital-image processor of claim 7 wherein the line buffer includes a temporary buffer for storing a portion of a fifth line, the portion being part of the array sent to the merged pipeline.

9. The digital-image processor of claim 5 wherein the mono-color pixels are not stored in a whole-frame buffer, but only in the line buffer and in pipeline registers, wherein all the pipeline registers together store less than a line of pixels, whereby whole-frame buffers are not needed.

10. The digital-image processor of claim 5 wherein the mono-color pixels captured by the image sensor form a Bayer pattern, the Bayer pattern having alternating red and green mono-color pixels on odd lines, and alternating green and blue mono-color pixels on even lines.

11. The digital-image processor of claim 5 wherein the fraction of the whole frame of the image that is stored by the line buffer is less than one percent of the whole frame, whereby the line buffer is 99 percent smaller than a whole-frame buffer.

12. The digital-image processor of claim 5 further comprising:

a white-balance multiplier, coupled to receive the mono-color pixels from the image sensor, for multiplying red pixels by a red gain, for multiplying green pixels by a green gain, and for multiplying blue pixels by a blue gain, the white-balance multiplier outputting white-balanced mono-color pixels to the line buffer, whereby the mono-color pixels are white-balanced on-the-fly before being written to the line buffer.

13. A method for processing digital images comprising:

receiving a series of mono-color pixels, each pixel representing one of three primary colors;

white-balancing the mono-color pixels by multiplying each mono-color pixel by a color-specific gain to produce balanced pixels;

writing the balanced pixels to a line buffer containing only a few lines of an image;

selecting a range within the line buffer, the range surrounding a target pixel;

horizontally interpolating balanced pixels for each line within the range selected from the line buffer, to produce intermediate components;

storing the intermediate components and some of the mono-color pixels within one column of the range selected from the line buffer in a column register;

vertically interpolating the intermediate components and mono-color pixels from the column register to produce a full-color pixel for the target pixel, and also producing a primary-color component for a pixel above the target pixel and a pixel below the target pixel;

detecting an edge at the target pixel by computing a filter value from the primary-color components of the target pixel and of the pixel above and the pixel below;

when the filter value exceeds a threshold, enhancing the edge by adjusting the target pixel; and outputting the full-color pixel after adjustment for edge enhancement as the target pixel, whereby the target pixel is interpolated and edge enhanced using outputs from vertical interpolation.

14. The method of claim 13 further comprising:

converting the full-color pixel to a YUV pixel that includes a Y brightness and U and V color components;

wherein enhancing the edge by adjusting the target pixel comprises adjusting the Y brightness but not the U and V color components of the YUV pixel;

wherein outputting the full-color pixel after adjustment comprises outputting the YUV pixel after Y adjustment for edge enhancement.

15. The method of claim 14 wherein horizontally interpolating balanced pixels comprises:

right-shifting a pair of digital values for mono-color pixels to weight the digital values;

adding right-shifted digital values for mono-color pixels to the immediate right and left of the target pixel to produce an intermediate component, whereby horizontal interpolation is performed by shifting and adding adjacent mono-color pixels on a line.

16. The method of claim 15 further comprising:

color enhancing the full-color pixel by adjusting the U and V color components of the YUV pixel but not adjusting the Y brightness;

wherein outputting the full-color pixel after adjustment comprises-outputting the YUV pixel after Y adjustment for edge enhancement and U and V adjustment for color enhancement, whereby color enhancement is performed.

17. A single-pass interpolator and edge detector comprising:

line-buffer means, receiving partial pixels with incomplete color information, for storing at least 2 lines of pixels of an image being processed but storing less than one-tenth of the image;

horizontal interpolate means, receiving a range of pixels from the line-buffer means, for processing pixels within the range through a horizontal filter, the horizontal filter operating only on pixels in a same line, the horizontal interpolate means outputting intermediate results;

column means, coupled to the horizontal interpolate means, for holding the intermediate results from a single column, the intermediate results including color information not present in a partial pixel but interpolated from adjacent pixels in a line;

vertical interpolate means, receiving the intermediate results from the column means, for processing the intermediate results to generate full-color information for a target pixel in the range, the full color information including an edge color, and for generating the edge color but not the full-color information for a pair of surrounding pixels adjacent to the target pixel; and edge detect means, receiving the edge color for the target pixel and for the pair of surrounding pixels from the vertical interpolate means, for detecting an edge within the image, whereby full-color information is interpolated from partial pixels while edge detection uses interpolation results without an intermediate full-frame buffer between the vertical interpolate means and the edge detect means.

18. The single-pass interpolator and edge detector of claim 17 further comprising:

color-space conversion means, receiving the full-color information for the target pixel, for converting the full-color information to brightness and hue information for output;

edge enhance means, activated by the edge detect means, for adjusting a brightness of the target pixel when an edge is detected, whereby edges are detected from the edge color, but brightness is adjusted.

19. The single-pass interpolator and edge detector of claim 18 wherein the column means stores intermediate results from a single column of the range of pixels read from the line-buffer means, whereby a single column of intermediate results are sent from the horizontal interpolate means to the vertical interpolate means.

20. The single-pass interpolator and edge detector of claim 19 wherein the horizontal interpolate means includes add means for adding color values of adjacent pixels;

wherein the vertical interpolate means includes shift means for weighting color values and add means for adding weighted color values of adjacent pixels.

*21. An apparatus, comprising:*

*a line buffer configured to receive mono-color pixel values corresponding to pixels in a digital image;*

*a color interpolation unit configured to receive mono-color pixel values from the line buffer and generate one or more additional color pixel values in a first color format;*

*a color converter unit configured to receive color pixel values from the color interpolation unit and convert received pixel values from the first color format to a second color format; and*

*an edge detection unit configured to detect an edge within the digital image;*

*wherein, for a given pixel in the digital image, the color converter unit and the edge detection unit are configured to perform color conversion and edge detection in parallel using the color pixel values for the given pixel that are generated by the color interpolation unit.*

*22. The apparatus of claim 21, wherein the color converter unit includes a register configured to store a red value, a green value, and a blue value, and wherein the color converter unit includes an RGB to YUV converter.*

*23. The apparatus of claim 21, further comprising a processing unit including the color interpolation unit, the color converter unit, and the edge detection unit.*

*24. The apparatus of claim 23, wherein the processing unit includes an edge enhancement unit.*

*25. The apparatus of claim 24, wherein the edge enhancement unit is configured to perform a processing operation on one or more pixel values in response to the edge detection unit detecting an edge within the digital image.*

*26. The apparatus of claim 25, wherein the edge enhancement unit is configured to increase a luminance value of one or more pixel values in response to the edge detection unit detecting an edge within the digital image.*

*27. The apparatus of claim 23, wherein the line buffer is configured to receive the pixel values from an image sensor, and wherein the line buffer and the processing unit are configured to process each of the pixels in the digital image without storing the pixels in a frame buffer.*

*28. The apparatus of claim 27, wherein the color interpolation unit includes a horizontal interpolation unit configured to perform interpolation based on pixel values within a same horizontal line of pixels.*

*29. The apparatus of claim 27, wherein the color interpolation unit includes a vertical interpolation unit configured to perform interpolation based on pixel values within a same column of pixels.*

*30. The apparatus of claim 28, wherein the color interpolation unit includes a vertical interpolation unit configured to perform interpolation based on pixel values within a same column of pixels.*

*31. The apparatus of claim 21, wherein each of the received mono-color pixel values is either a red, green, or blue color value, and wherein the edge detection unit is configured to perform edge detection based only on green pixel values.*

*32. A method, comprising:*

*receiving, at a line buffer, mono-color pixel values corresponding to pixels in a digital image;*

*at a color interpolation unit, generating one or more additional color pixel values corresponding to the mono-color pixel values and outputting intermediate pixel values in a first color format;*

*a color converter unit converting pixel values in the first color format to pixel values in a second color format; and*

*an edge detection unit detecting an edge within the digital image;*

*wherein said converting pixel values and said detecting an edge are performed in parallel.*

*33. The method of claim 32, further comprising:*

*a color enhancer unit performing color enhancement on pixel values in the second color format; and*

*an edge enhancer unit performing edge enhancement on pixel values in the second color format;*

*wherein, for a given pixel value, said performing color enhancement and said performing edge enhancement occurs at the same time.*

*34. The method of claim 33, wherein the second color format is YUV;*

*wherein the edge detection unit is configured to detect edges based only on green pixel values; and*

*wherein the edge enhancer is configured to receive:*

*a Y value from the color converter unit; and*

*input from the edge detection unit.*

*35. The method of claim 32, further comprising storing the digital image.*

*36. The method of claim 32, wherein the color converter unit includes a color enhancer and a register configured to store a red value, a green value, and a blue value.*

*37. The method of claim 32, wherein the first color format includes red, green, and blue values and the second color format includes luminance and chrominance values.*

*38. The method of claim 32, wherein the method is performed by a digital camera.*

*39. An apparatus, comprising:*

*first means for receiving mono-color pixel values corresponding to pixels in a digital image;*

*second means for receiving digital pixel values from the first means and generating additional color pixel values in a first color format;*

*third means for converting pixel values from the first color format to a second color format; and*

*fourth means for detecting an edge within the digital image;*

*wherein, for a given pixel in the digital image, the third means and the fourth means are configured to operate in parallel.*

*40. The apparatus of claim 39, further comprising*

*fifth means for enhancing color of pixel values in the second color format; and*

*sixth means for enhancing one or more edges within the digital image;*

*wherein, for a given pixel in the digital image, the fifth means and the sixth means are configured to operate at the same time.*

*41. The apparatus of claim 39, wherein the first color format is RGB.*

*42. The apparatus of claim 39, wherein the second color format is YUV.*

*43. The apparatus of claim 39, wherein the apparatus is a digital camera.*

*44. A method, comprising:*

*generating a frame of digital mono-color pixel values at an image sensor in a digital camera;*

*processing digital pixel values received from said image sensor to produce a digital image, wherein said processing is performed without using a whole frame buffer;*

*wherein said processing further includes:*

*performing color interpolation on said mono-color pixel values to produce pixel values in a first color format;*

*converting pixel values from the first color format to a second color format; and*

*detecting an edge in the digital image;*

*wherein for a given pixel in the digital image, said converting and said detecting occur in parallel.*

*45. The method of claim 44, wherein said processing includes white balancing pixel values.*

*46. The method of claim 44, wherein said processing includes storing pixel values in a line buffer.*

*47. The method of claim 44, wherein the first color format is RGB.*

*48. The method of claim 44, wherein the second color format is YUV.*

*49. The method of claim 48, wherein said processing includes:*

*enhancing colors of pixel values in the second color format; and*

*enhancing one or more edges in the digital image;*

*wherein said enhancing colors and said enhancing one or more edges, for a given pixel in the digital image, occur at the same time.*

*50. The method of claim 49, wherein said enhancing one or more edges includes altering a luminance value.*

*51. The method of claim 44, wherein said performing color interpolation includes using vertical and horizontal interpolation to generate additional color values for mono-color pixels.*

*52. The method of claim 44, wherein said processing includes performing color enhancement.*

*53. The method of claim 44, wherein said processing includes performing edge enhancement and color enhancement concurrently on a given set of pixel values.*

*54. An apparatus, comprising:*

*a line buffer configured to store digital pixel values received from an image sensor; and*

*a pipeline coupled to the line buffer;*

*wherein the pipeline is configured to receive digital pixel values from the line buffer and to generate final pixel values usable to display and/or store a digital image;*

*wherein the pipeline is configured to:*

*for a given pixel in the digital image, perform color conversion and edge detection on the given pixel in parallel; and*

*for a given pixel in the digital image for which an edge is detected, perform color enhancement and edge enhancement in parallel;*

*wherein the apparatus is configured generate the final pixel values without using a whole frame buffer.*

*55. The apparatus of claim 54, wherein the pipeline includes a color interpolation unit configured to receive a plurality of mono-color pixel values from the line buffer and to generate additional color values for each pixel position.*

*56. The apparatus of claim 55, wherein the color interpolation unit includes separate horizontal and vertical interpolation units, each of which is configured to use color values from neighboring pixels to generate additional color values for a current pixel.*

*57. The apparatus of claim 56, wherein the color interpolation unit is configured to use separate interpolation filters for each color value produced by the color interpolation unit.*

*58. The apparatus of claim 55, wherein the mono-color pixel values are either red, blue, or green, and wherein, for each received mono-color pixel value, the color interpolation unit is configured to generate two additional color values, wherein the two additional color values are red and blue if the received mono-color pixel value is green, wherein the two additional color values are red and green if the received mono-color pixel value is blue, and wherein the two additional color values are blue and green if the received mono-color pixel value is red.*

*59. The apparatus of claim 55, wherein the color interpolation unit is coupled to an edge detection unit and a color conversion unit, and wherein the color interpolation unit is configured to output pixel color values to the edge detection unit and the color conversion unit, wherein the edge detection unit and the color conversion unit are configured to operate concurrently on a given set of pixels.*

*60. The apparatus of claim 54, wherein the pipeline includes a color interpolation unit configured to receive a plurality of mono-color pixel values from the line buffer, wherein the mono-color pixel values are either red, blue, or green, and wherein the color interpolation unit is configured to generate additional color values for a received pixel value only if the received pixel value is red or blue.*

*61. The apparatus of claim 54, wherein the pipeline includes first means for performing color interpolation upon mono-color pixel values received from the line buffer.*

*62. The apparatus of claim 61, wherein the pipeline includes second means for performing said color conversion on pixel values received from the first means, and wherein the pipeline includes third means for performing said edge detection on pixel values received from the first means.*

*63. The apparatus of claim 62, wherein the second means and the third means are configured to operate concurrently on a given set of pixel values.*

*64. The apparatus of claim 54, wherein the pipeline includes a color interpolation unit coupled to a color conversion unit via a pixel register, wherein the pixel register is configured to store a plurality of color values for a given pixel position.*

*65. The apparatus of claim 54, wherein the pipeline includes a color interpolation unit coupled to a edge detection unit via a pixel storage unit configured to store pixel values from at least a current column.*

*66. The apparatus of claim 65, wherein the edge detection unit is configured to receive only green color values of a given pixel position.*

*67. The apparatus of claim 54, wherein the pipeline includes a color conversion unit.*

*68. The apparatus of claim 67, wherein the color conversion unit is configured to convert RGB color values to YUV values.*

*69. The apparatus of claim 54, wherein the pipeline includes first means for converting incoming color values in a first color format to outgoing color values in a second color format.*

*70. The apparatus of claim 69, wherein the first color format includes red, blue, and green color values.*

*71. The apparatus of claim 69, wherein the second color format includes luminance and chrominance values.*

*72. The apparatus of claim 70, wherein the second color format includes luminance and chrominance values.*

*73. The apparatus of claim 54, wherein the pipeline includes an edge detection unit configured to perform edge detection.*

*74. The apparatus of claim 54, wherein the edge detection unit is configured to perform edge detection using only green color values.*

*75. The apparatus of claim 54, wherein the pipeline includes first means for performing edge detection on received pixel values.*

*76. The apparatus of claim 75, wherein the first means is configured to perform edge detection using green color values and not other color values.*

*77. The apparatus of claim 54, wherein the pipeline includes a color enhancement unit configured to modify color values received as inputs.*

*78. The apparatus of claim 54, wherein the color enhancement unit is directly coupled to a color conversion unit.*

*79. The apparatus of claim 78, wherein the color enhancement unit is configured to receive input luminance and chrominance values and is further configured to generate output luminance and chrominance values.*

*80. The apparatus of claim 54, wherein the pipeline further includes first means for performing color enhancement of received pixel color values.*

*81. The apparatus of claim 54, wherein the pipeline includes an edge enhancement unit coupled to adjust a luminance value of a pixel upon detection of an edge.*

*82. The apparatus of claim 54, wherein the pipeline includes first means for adjusting a luminance value of a pixel in response to detection of an edge.*

* * * * *

UNITED STATES PATENT AND TRADEMARK OFFICE

CERTIFICATE OF CORRECTION

PATENT NO. : RE42,555 E
APPLICATION NO. : 11/267917
DATED : July 19, 2011
INVENTOR(S) : Lin et al.

It is certified that error appears in the above-identified patent and that said Letters Patent is hereby corrected as shown below:

Column 17, line 58, in Claim 16, delete "comprises-outputting" and insert -- comprises outputting --.

Column 20, line 25, in Claim 40, delete "*comprising*" and insert -- *comprising:* --.

Column 21, line 28, in Claim 54, delete "*configured generate*" and insert -- *configured to generate* --.

Column 22, line 15, in Claim 65, delete "a *edge*" and insert -- *an edge* --.

Signed and Sealed this
Tenth Day of January, 2012

David J. Kappos

David J. Kappos
*Director of the United States Patent and Trademark Office*